(No Model.)　　　　　　　　　　　　　　　　8 Sheets—Sheet 1.
M. H. SMITH.
ELECTRIC RAILWAY SYSTEM AND CAR.
No. 310,962.　　　　　　　　　Patented Jan. 20, 1885.

WITNESSES
Philip M. Justice
Allen ? Jones

INVENTOR
M. Holroyd Smith.

(No Model.) 8 Sheets—Sheet 2.

M. H. SMITH.
ELECTRIC RAILWAY SYSTEM AND CAR.

No. 310,962. Patented Jan. 20, 1885.

WITNESSES
Philip M. Justice
Allen P. Jones

INVENTOR
M. Holroyd Smith.

(No Model.) 8 Sheets—Sheet 3.

M. H. SMITH.
ELECTRIC RAILWAY SYSTEM AND CAR.

No. 310,962. Patented Jan. 20, 1885.

WITNESSES
Philip M. Justice
Allen T. Jones

INVENTOR
M. Holroyd Smith (No Model.)  8 Sheets—Sheet 4.
M. H. SMITH.
ELECTRIC RAILWAY SYSTEM AND CAR.
No. 310,962. Patented Jan. 20, 1885.
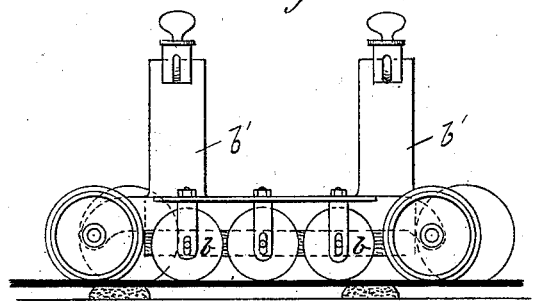
Fig. 4
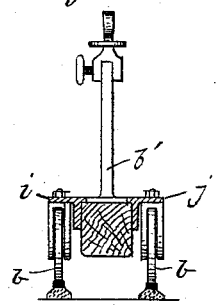
Fig. 6
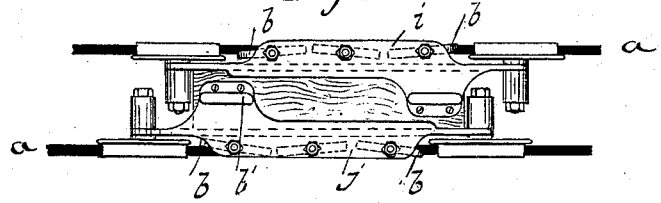
Fig. 5
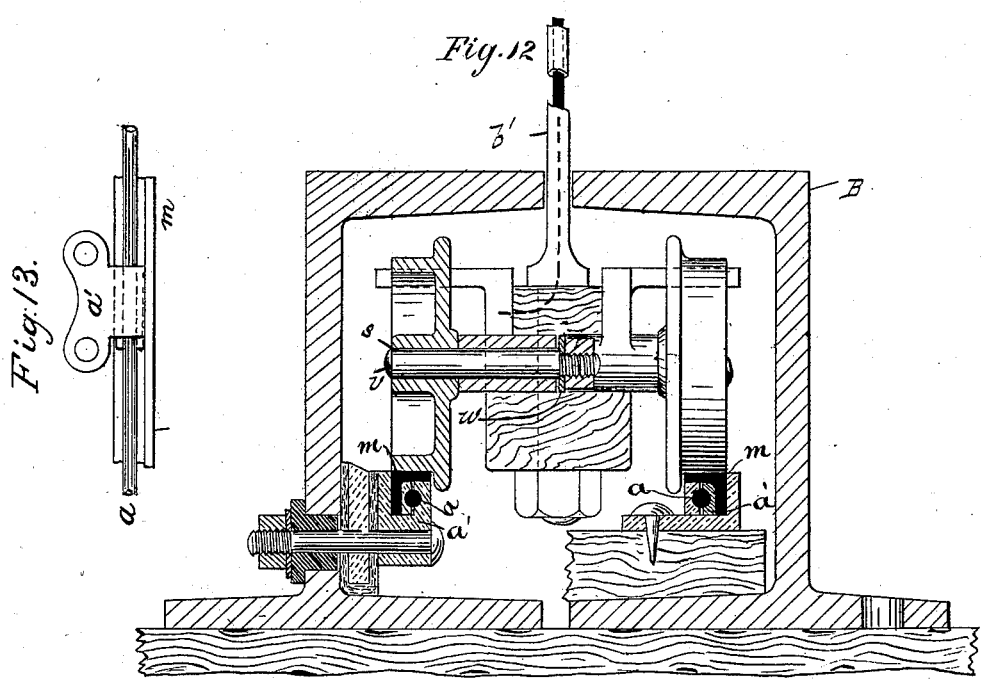
Fig. 12
Fig. 13
WITNESSES
Philip M. Justice
Allen P. Jones
INVENTOR
M. Holroyd Smith (No Model.) 8 Sheets—Sheet 5.
M. H. SMITH.
ELECTRIC RAILWAY SYSTEM AND CAR.
No. 310,962. Patented Jan. 20, 1885.
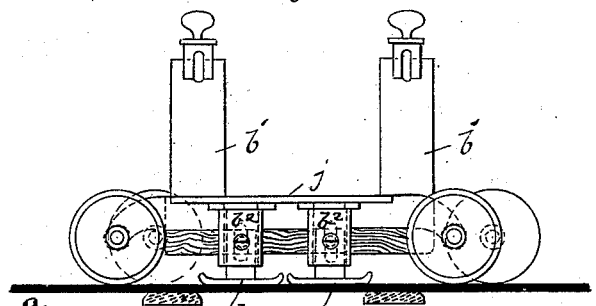
Fig. 7
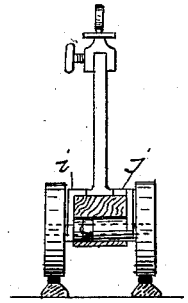
Fig. 6ᵃ
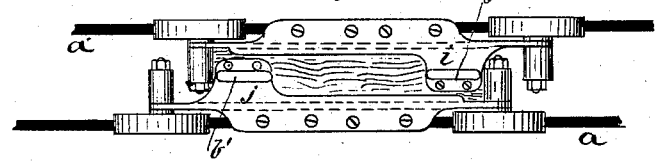
Fig. 8
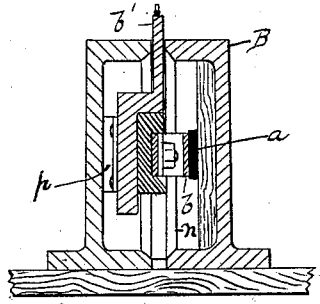
Fig. 16
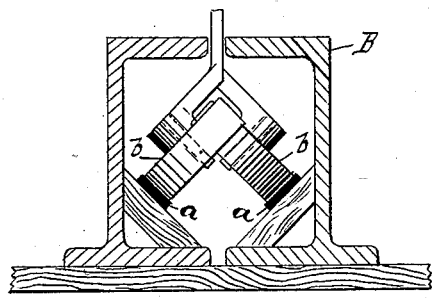
Fig. 17
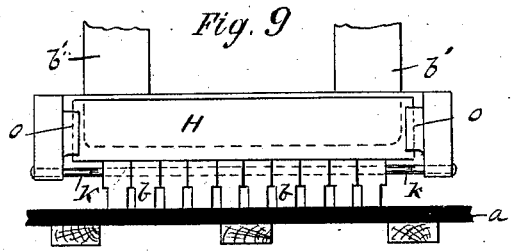
Fig. 9
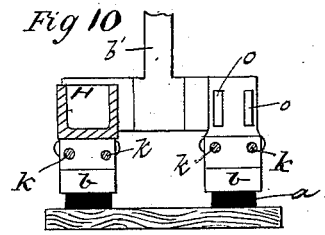
Fig. 10
WITNESSES
Philip M. Justice
Allen P. Jones
INVENTOR
M. Holroyd Smith (No Model.)  8 Sheets—Sheet 6.

M. H. SMITH.
ELECTRIC RAILWAY SYSTEM AND CAR.

No. 310,962. Patented Jan. 20, 1885.

WITNESSES
Philip M. Justice
Allen P. Jones

INVENTOR
M. Holroyd Smith.

(No Model.)  8 Sheets—Sheet 7.
M. H. SMITH.
ELECTRIC RAILWAY SYSTEM AND CAR.
No. 310,962.  Patented Jan. 20, 1885.
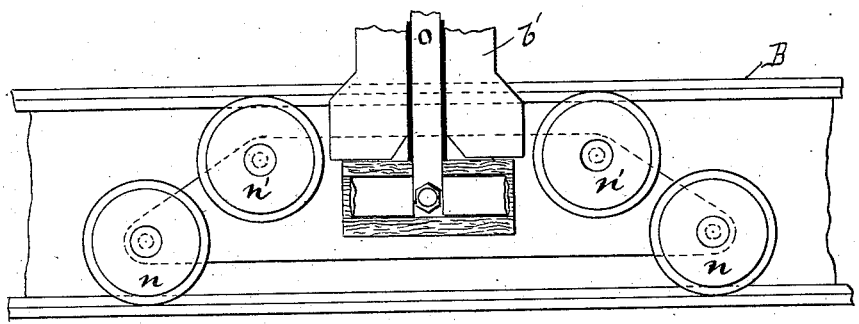
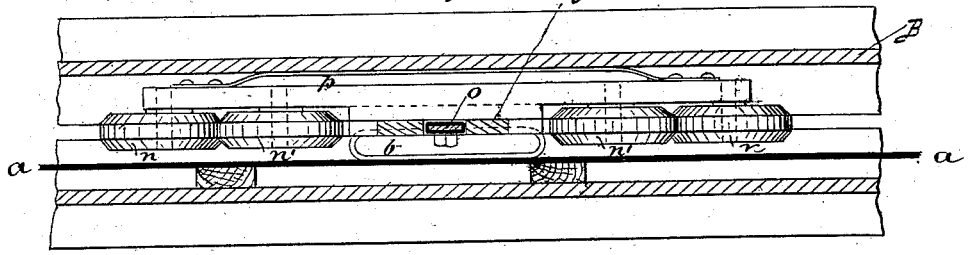
WITNESSES  INVENTOR (No Model.)  8 Sheets—Sheet 8.
M. H. SMITH.
ELECTRIC RAILWAY SYSTEM AND CAR.
No. 310,962.  Patented Jan. 20, 1885.
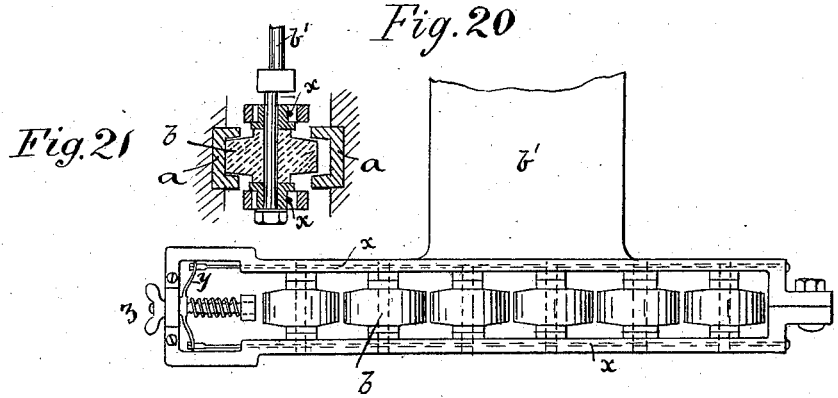
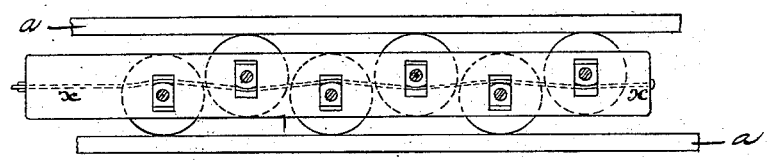
WITNESSES  INVENTOR

UNITED STATES PATENT OFFICE.

MICHAEL HOLROYD SMITH, OF HALIFAX, COUNTY OF YORK, ENGLAND.

ELECTRIC RAILWAY SYSTEM AND CAR.

SPECIFICATION forming part of Letters Patent No. 310,962, dated January 20, 1885.

Application filed November 24, 1883. (No model.) Patented in England February 24, 1883, No. 1,014, and in France July 27, 1883, No. 156,767.

*To all whom it may concern:*

Be it known that I, MICHAEL HOLROYD SMITH, a subject of Her Majesty the Queen of Great Britain, residing at Halifax, in the county of York, England, have invented certain new and useful Improvements in Electric Railway Systems and Cars, (patented in England February 24, 1883, No. 1,014, and in France July 27, 1883, No. 156,767,) of which the following is a specification.

This invention principally relates to that class of tramways in which electricity is the moving or propelling force employed for driving the tram or other cars.

The invention consists of the improved arrangement and combination of parts or apparatus hereinafter more fully described and set forth, reference being had to the accompanying drawings, which form part of this specification, and in which like letters of reference refer to corresponding parts.

Figure 1:
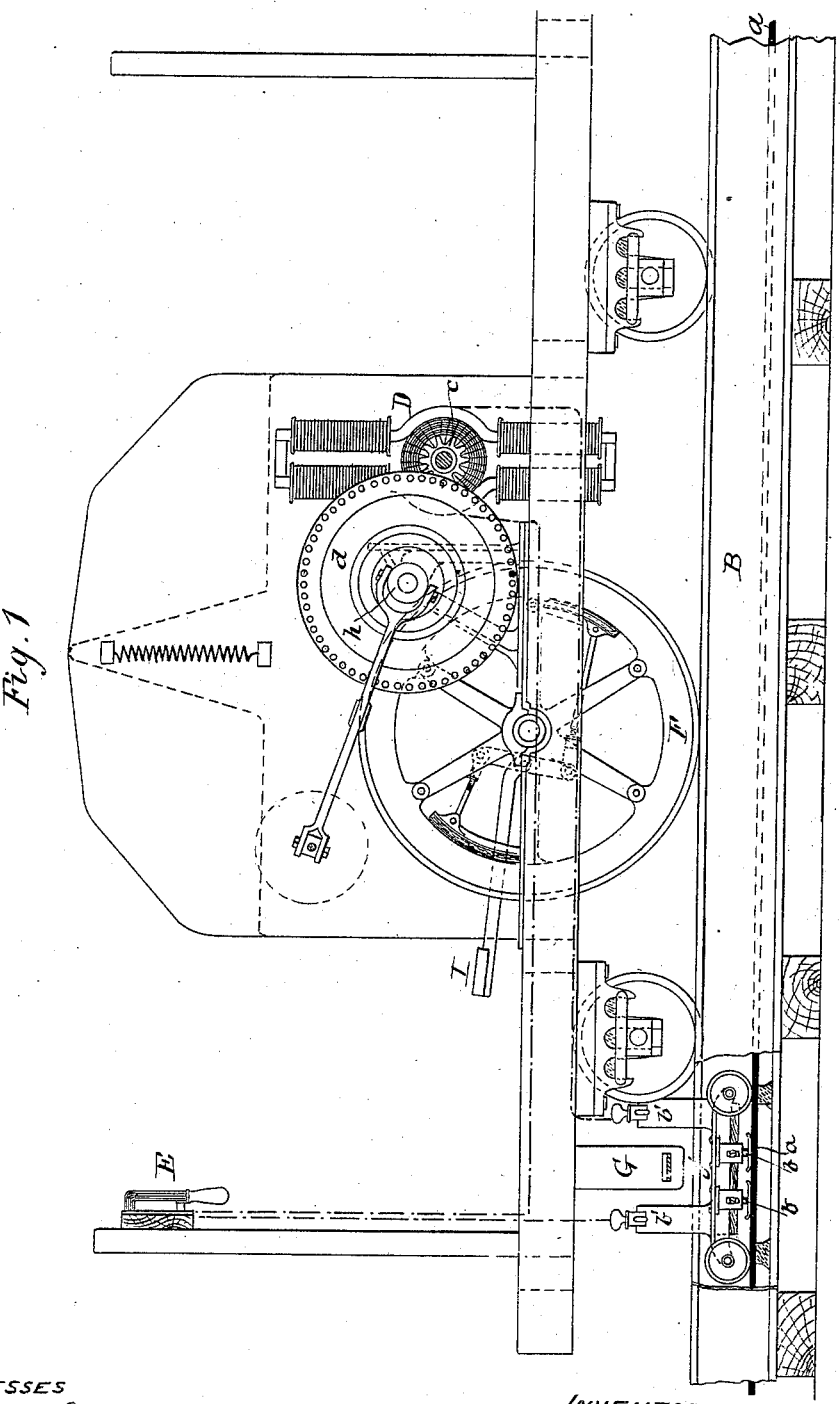
Figure 2:
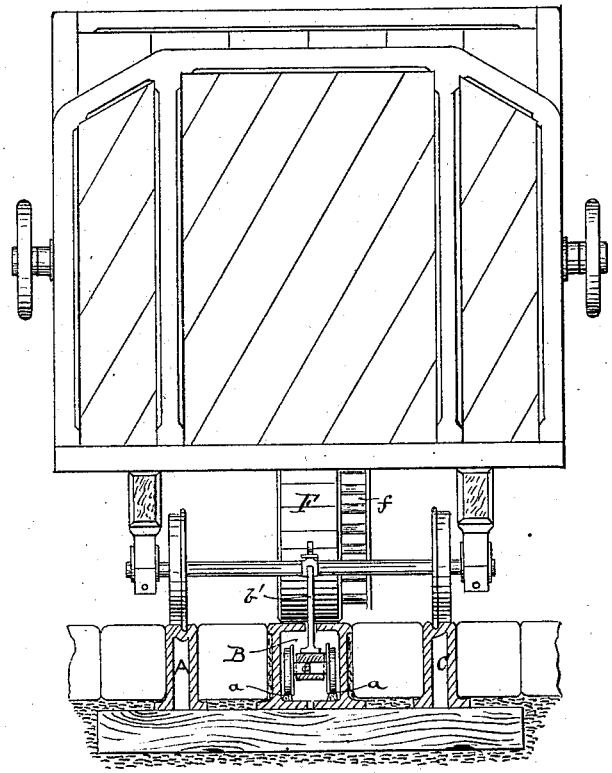
Figure 3:
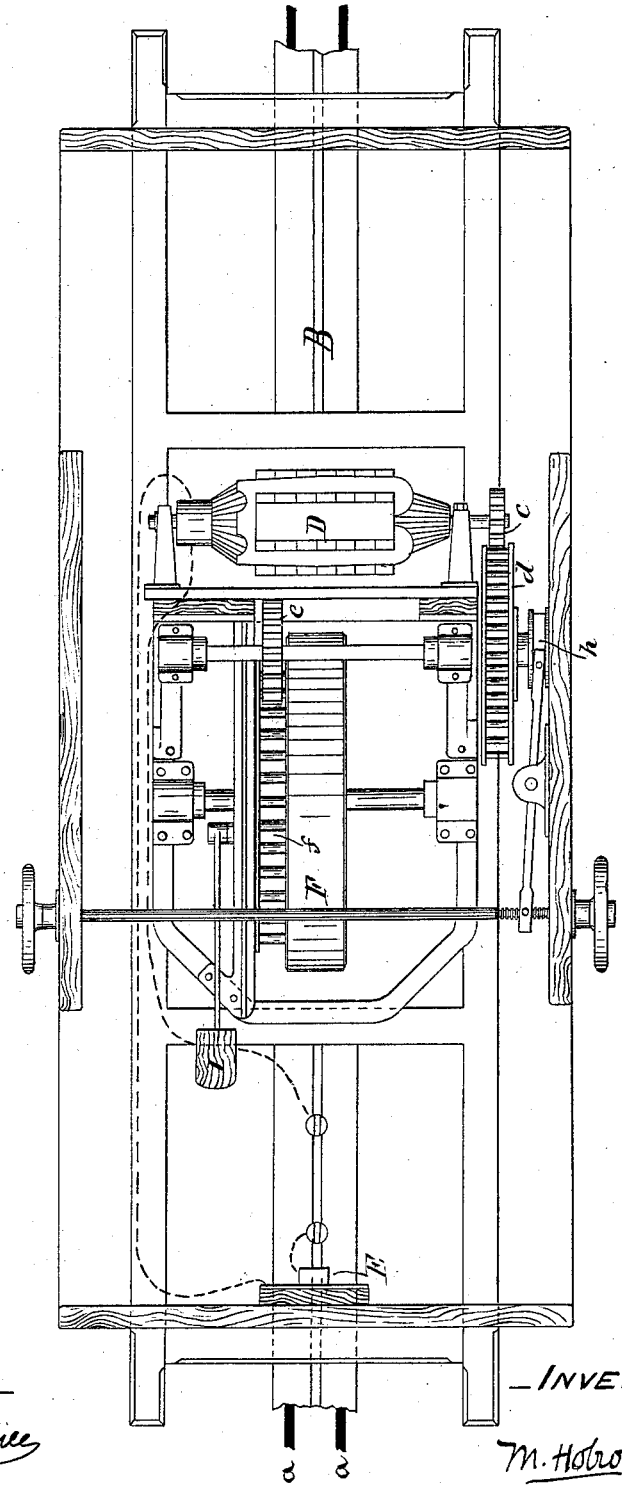
Figure 11:
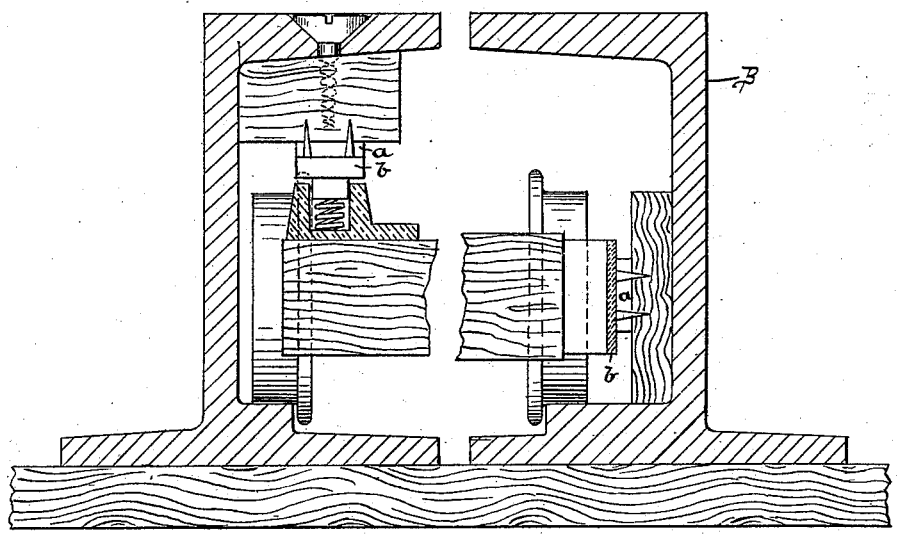
Figure 18:
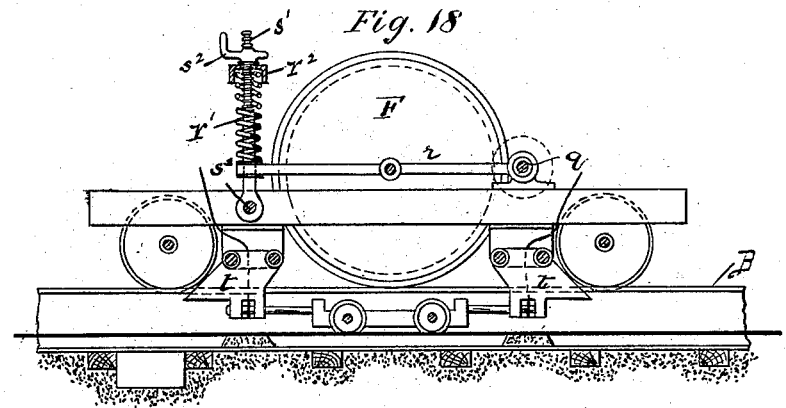
Figure 19:
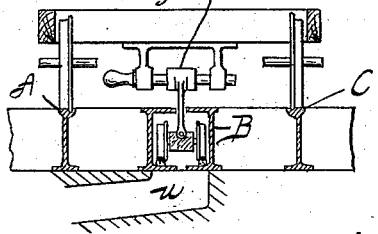

Figures 1, 2, and 3 represent, respectively, a side elevation, end elevation, and plan of an electric tram-engine and the tramway. Figs. 4, 5, and 6 represent, respectively, a side elevation, a plan, and an end elevation of one form of trolley or truck for collecting the current and passing it to the electric engine or motor. Figs. 6$^a$, 7, 8, 9, and 10 represent modifications of the trolleys or bogies. Figs. 11, 12, and 13 represent a central channel, showing different methods of fixing and insulating the conducting bands or rails. Figs. 14, 15, 16, and 17 represent modifications of the channel and collectors. Figs. 18 and 19 represent methods of regulating the pressure of driving-wheel and of communicating with the central channel, while Figs. 20, 21, and 22 show a trolley or bogie with wheels traveling in a horizontal plane.

According to the arrangement of my invention, as best shown in Fig. 2, I employ three lines of rail, A, B, and C, the additional one, B, being preferably midway between the ordinary side rails, although I do not confine myself to this position. The central rail forms a hollow channel, being composed of two I-plate girders or channel-irons placed side by side, as shown. The conducting-bands $a\,a$ are laid therein and insulated from the rail or channel B. The two I-plates rest upon the same sleepers that support the ordinary rails, the upper surface of the said plates forming the central rail. The contact-makers $b\,b$ are mounted upon a small trolley, which runs upon the conducting-bands $a\,a$ within the hollow central rail, B. Metal plates $b'\,b'$ on the trolley pass through a slit or opening between the upper parts of the two I-plates, and carry the conducting-wires to and from the electric motor D through the switch E, and power is then transmitted by any suitable gear, such as $c\,d\,e\,f$, governed by friction-clutch $h$, to the large diameter driving-wheel F, which runs on the central line of rails B, and is provided with foot-brake I, this wheel and its connected parts being in addition to the ordinary side wheels. If but two lines of rail are used, one or both of the rails may be made hollow, and a trolley or trolleys be employed therein, as for the central rail already described, to collect the electricity from the conducting wires or bands and transfer it to the motor.

The form of trolleys or bogies shown in Fig. 1 is represented upon a larger scale in Fig. 7, in which the collecting slippers or skids $b$ are free to rise and fall within the casing $b^2$, and thus allow for any vibration, elevation, or depression of the trolley or of the conducting-bands. The running wheels on either side of the trolley also act as collectors. The wheels and slippers on either side are held by separate frames or plates $i\,j$, insulated from each other, as shown in Fig. 8, and each one carrying one of the uprights $b'\,b'$.

In Figs. 4, 5, and 6 the four end wheels are flanged and run upon the bands, so as to keep the trolley upon the track, while the six collecting-wheels $b\,b$ are free to rise and fall in their slotted supports in the same manner and for the reasons described in reference to Fig. 7. The bearings are made adjustable, so that the wheels may be set at an angle from the direct line of travel, and thus can be secured a frictional as well as a rolling contact. The trolley may be caused to travel with the car in any convenient manner—say such as shown in Fig. 1, in which a portion of the frame-work G of the car passes between the uprights $b'\,b'$; but I do not, of course, confine myself to this method.

In Figs. 9 and 10 the collectors $b\,b$ are preferably brass blocks threaded or strung like beads upon copper wire or other suitable conductors, K.

The frames may be made with projection $o$ to form grooves, into which fit the ends of boxes H, bearing upon blocks $b$, and which may be weighted with shot or other material in order to obtain any desired amount of pressure upon the blocks.

Fig. 11 represents in approximately full size a section of the channel in which runs the collecting-trolley. In this form the girders or plates are made of special form, so as to form of themselves the trolley-rails. Upon the left of the figure the conducting-band $a$ is represented as being insulatedly attached above the level of the wheels, while a brush or collector, $b$, is pressed against it by a spring. Upon the right of the figure the band $a$ is secured to but insulated from the side of the channel, the brush or collector passing along and being pressed against it. In either of these arrangements two conductors, $a\,a$, could be employed, or one could be used alone as the positive wire, while the return-current could be conveyed through the iron of the channel, connection being made by means of the trolley-wheels.

In Fig. 12 another form of arrangement is shown, in which the conducting-band $a$ is firmly held between brass or other conducting material or chair, $a'$, which in its turn carries the rail $m$, formed of angle-iron, upon which wheels formed of conducting material, but insulated from each other, run. The insulation of these wheels may be effected in the following manner: The axle $v$ of one of the wheels is surrounded by a covering of insulating material, $s$, as shown by the heavy lines, extending from the extreme outer end of said axle to a washer-disk, $w$, also of insulating material. The material $a'$ is also suitably held and insulated from the sides and bottom of the channel.

Fig. 13 represents a side view of the chair $a'$, the conducting-band $a$, and the rail $m$. The conductor is formed by a combination of angle-iron and copper wire. The angle-iron makes a firm rail for the trolley to run upon. The copper wire lessens the resistance on transmission of the electric force, and the whole is easily constructed and fixed.

Figs. 14, 15, and 16 represent further modifications of the arrangement of the collecting-trolley and channel. In this form the trolley consists of a vertical plate having and kept in position by four truncated V-shaped wheels, $n\,n$ and $n'\,n'$, the former working in the bottom slot or space between the channel-girders, while the latter work in the corresponding top groove. The conducting-band $a$ is carried upon one side of the channel, but insulated therefrom, and upon said band $a$ the collecting brushes or springs $b$ rub, collecting the electricity which passes through insulated plate $o$ to the switch and motor, the return-current passing by the trolley and wheels through the channel. A back spring, $p$, may also be used to insure contact.

In Fig. 17 the wheels themselves come in contact with the conducting-bands $a$ as they do in Figs. 1, 2, and 3; but in this case they are represented as traveling at an angle to both the bottom and sides of the channel, and further reference need not here be made to this form, as it will be readily understood from the drawings.

In Fig. 18 the main wheel F is shown as being carried in a frame, $r$, hinged at $q$. The other end of this frame is held upon the rod $s'$, screw-threaded at its upper end and pivoted to the car-body at $s^3$. A coiled spring, $r'$, surrounds the rod $s'$ and rests at its lower end upon the frame $r$, and is held at its upper end in the cap $r^2$, which latter is loose upon the screw-rod $s'$. A handled nut, $s^2$, screws down upon the cap $r^2$ to compress the spring to produce the desired pressure of the wheel F upon its track. The screw acting through a spring, the wheel is still free to move without jolting the car. In this figure is also shown an arrangement of passing two plates, $t\,t$, one before and one behind the main wheel F, through the slit, for the double purpose of clearing the slit and connecting with and dragging the trolley, which in this form has no plates passing through the said slit. Each of these plates $t\,t$ is carried upon two pins, and has lateral motion to compensate for oscillations, curves, &c., and these pins can be withdrawn and the plates removed when desired.

In Fig. 19 a hole or well, $u$, is shown, whereby any water accumulating in the channel can be conducted to the ordinary street-drain or other source of discharge.

Fig. 20 represents a side elevation of a trolley adapted to travel in or against the metal conducting bands or rails $a$, shown in end sectional elevation in Fig. 21, while Fig. 22 represents a top view showing more clearly the means by which the trolley-wheels are kept against their respective conducting-bands. In this arrangement the alternate wheels bear upon the same conductor, and are held in contact by means of steel springs or wires $x$, which pass through or press against the bearings of each wheel. The amount of such pressure upon each side of the wheels may be equally regulated by means of rigid arm $y$ and set-screw, spring, and nut $z$, while, for convenience of mounting, the frame carrying the wheels, and in which the journals have the requisite play, is formed in two or more sections, suitably bolted or otherwise connected together.

In all the forms shown the main idea remains always the same, and that is an inclosed or partially-inclosed channel protecting the conducting-bands from inflicting or imparting injury, or from being injured, said channel being adapted to receive or contain collecting trolleys or brushes traveling with the car and imparting or passing the current so collected to the motor, thus enabling the car to be driven. The main driving-wheel F is adapted to take the greatest portion of the load, and traveling upon a flat surface enables the car to pass around curves with great facility, and increases the tractive efficiency of the car.

I am aware that it is old to apply an electric motor to railway-cars and supply the current thereto at pleasure by a trolley or brush or other trailing device put in contact with conductors, and that such contact-makers have been held down movably upon the conductors by springs.

I am also aware that in train-telegraphs the trolley has been provided with yielding contacts. I do not broadly claim either of these features, nor their generic combination; but I do believe myself to be the first to construct an electric railway system in which the car is supplied with an electric motor, wires, and a switch, and has mechanically and electrically combined therewith a trolley in an underground conduit containing insulated conductors, said trolley having contact-makers to transmit the current from the conductors to the motor, and said contact-makers being movable with relation to the trolley, and further automatically movable with relation to the conductors, so as to keep in contact therewith irrespective of the motion of the trolley, whereby the continuity of the current is secured and regulated.

I have found that strict attention alone to these several details gives satisfactory results, and I make no broader claim than is herein explained by way of differentiation over the work of prior inventors.

Having thus described the nature of my invention and how the same may be practically employed, what I claim, and desire to secure by Letters Patent, is—

1. In an electric railway system, a car provided with an electric motor and suitable driving-wheels, an underground channel or conduit provided with the insulated conductors, and a trolley or truck traveling in said channel or conduit, and having attached thereto the contact-makers, movable with relation to said trolley or truck, and provided with means to hold said contact-makers against the conductors, and suitable connections and switch for operating the electric motor, as set forth.

2. In combination with an electric railway or track having the additional central rail or conduit, a railway-car having the main driving-wheel F, provided with a frame, $r$, hinged at $q$, held at its movable end on the pivoted screw-rod $s'$, a spring, $r'$, and cap $r^2$, and a handled nut, $s^2$, on said screw-rod, whereby the driving-wheel is adjustably and yieldingly held on its track, as described.

M. HOLROYD SMITH.

Witnesses:
PHILIP M. JUSTICE,
ALLEN K. JONES.